United States Patent [19]
Lemmen

[11] Patent Number: 5,493,935
[45] Date of Patent: Feb. 27, 1996

[54] USER SUPPORTING STEERING WHEEL

[76] Inventor: Roger D. Lemmen, 1241 Heather Dr., Holland, Mich. 49423

[21] Appl. No.: 158,956

[22] Filed: Nov. 29, 1993

[51] Int. Cl.⁶ .................................................. B62D 1/04
[52] U.S. Cl. ........................................................ 74/552
[58] Field of Search ............................. D12/175, 176, D12/177; 74/552; 280/750

[56]  References Cited

U.S. PATENT DOCUMENTS

| | | |
|---|---|---|
| 2,798,568 | 7/1957 | Zeller . |
| 3,176,537 | 4/1965 | Zeigler . |
| 3,580,101 | 5/1971 | Jorgensen . |
| 3,691,866 | 9/1972 | Berkes . |
| 3,718,053 | 2/1973 | Cinadr . |
| 4,217,792 | 8/1980 | Kesling . |
| 4,449,419 | 5/1984 | Soler Bruguera . |
| 4,655,308 | 4/1987 | Kraus et al. . |

FOREIGN PATENT DOCUMENTS

| | | | |
|---|---|---|---|
| 4105110 | 8/1992 | Germany | 74/552 |
| 0015458 | 5/1904 | United Kingdom | 74/552 |
| 2058694 | 4/1981 | United Kingdom | 74/552 |

*Primary Examiner*—Rodney H. Bonck
*Assistant Examiner*—Mary Ann Battista
*Attorney, Agent, or Firm*—Price, Heneveld, Cooper, DeWitt & Litton

[57]  ABSTRACT

A steering wheel assembly includes a steering column, a tilt adjustment mechanism connected to the column for adjusting the angular position thereof and a steering wheel rotatably mounted on the column. The steering wheel includes a generally circular rim and a forearm, wrist and hand support portion joined to the rim. The support portion is configured to support the wrists and hands in a cocked up or neutral anatomical position to reduce or eliminate symptoms associated with carpal tunnel syndrome. The support portion defines a thumb cutout aperture. The user's thumbs and fingers can be wrapped around the steering wheel rim.

5 Claims, 1 Drawing Sheet

USER SUPPORTING STEERING WHEEL

BACKGROUND OF THE INVENTION

The present invention relates to steering wheel assemblies for vehicles and, more particularly, to a unique steering wheel assembly adapted to support the forearms, wrists and hands of the user.

Conventional steering wheel assemblies found in automobiles, buses, trucks and other vehicles include a steering column which rotatably supports a generally circular steering wheel. The wheel includes a rim which is grasped by the user to steer the vehicle. Adjustment mechanisms may be included in the assembly to adjust the angular position of the wheel and the spacing of the wheel with respect to the user. The steering wheel position may, therefore, be adjusted to the physical characteristics of the particular user. Most vehicle steering wheel assemblies, especially those associated with automobiles, position the wheel so that no support is provided to the forearms. In addition, the wheel blocks the operator's view of dashboard-mounted instruments. The lack of proper support results in fatigue which affects the forearm, shoulder and neck muscles. In addition, numbness of the type associated with carpal tunnel syndrome is common.

Carpal tunnel syndrome is a painful condition associated with repetitive use of the hands and wrists. The condition is caused by compression of the median nerve as it passes through the carpal tunnel of the wrist. The median nerve innervates muscles which function to flex the hand and forearm. Symptoms include numbness, tingling and a painful burning sensation in the fingers which can radiate up the forearm to the shoulder. Individuals who suffer from carpal tunnel syndrome will experience the symptoms when operating a motor vehicle.

Prior attempts to alleviate the fatigue problems, numbness and pain associated with driving have taught the elimination of the steering wheel assembly. One such proposal is disclosed in U.S. Pat. No. 3,176,537 entitled STEERING MECHANISM, which issued on Apr. 6, 1965 to Zeigler. The Zeigler patent discloses a steering system which provides a console device mounted to provide a rest or support for the arms and hands of the vehicle operator and which includes manually manipulable steering knobs mounted on the console. The knobs are turned by the operator's fingers while the operator's arms and hands are at rest on the console.

SUMMARY OF THE INVENTION

In accordance with the present invention, an ergonomically designed steering wheel assembly is provided which supports the forearms, wrists and hands of the user to reduce stress on the shoulder and neck muscles and symptoms of the type associated with carpal tunnel syndrome. Essentially, the assembly includes a steering wheel having a rim and a support portion joined to an inner periphery of the rim. The support portion is dimensioned and configured to provide support for the forearms of the user and to position the hands and wrists in a cocked up or a substantially normal anatomical position, thereby relieving pressure on the upper arm and reducing symptoms associated with carpal tunnel syndrome and problems of neck and shoulder strain.

In narrower aspects of the invention, the assembly positions the steering wheel at an angle closer to horizontal than that typically found in current automobiles and which permits easy viewing of dashboard-mounted instruments. Provision is made for adjusting the angle or tilt position of the steering wheel to accommodate the assembly to the physical characteristics of the operator. Strain or fatigue associated with grasping a conventional steering wheel at the ten o'clock and two o'clock positions is substantially eliminated. Steering is accomplished with forward and backward movement of the arms using the larger muscles thereby further reducing manipulation and repetitive use of the hands and wrists.

DETAILED DESCRIPTION OF THE PREFERRED EMBODIMENT

Figure 1:
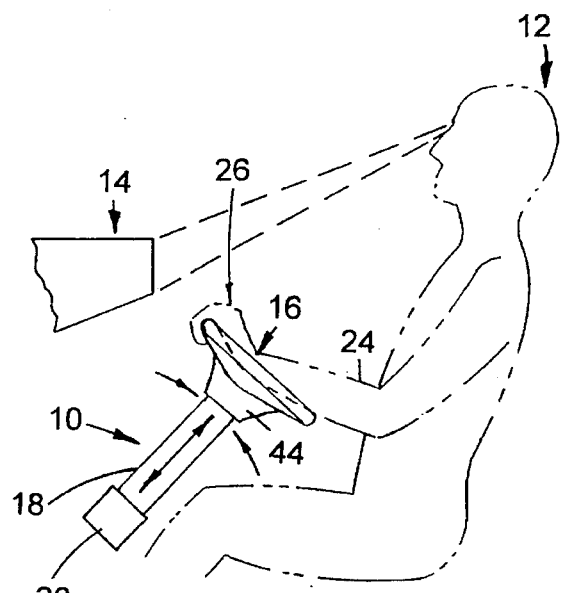
FIG. 1 is a side, elevational view schematically illustrating the use of a steering assembly in accordance with the present invention in a vehicle.

A steering wheel assembly in accordance with the present invention is illustrated in FIG. 1 and generally designated by the numeral 10. As shown, steering wheel assembly 10 is positioned in front of the user 12 and below the dashboard 14 of the vehicle. Dashboard 14 supports instruments in a conventional fashion. Steering wheel assembly 10 includes a steering wheel 16 rotatably mounted on a steering column 18. An adjustment mechanism 20, which is of a conventional form, provides angular tilt adjustment for the steering column and, hence, wheel 16. Longitudinal or telescoping adjustment of the column may be provided by mechanism 20 to position the wheel 16 towards and away from the user along the column.

As shown in FIG. 1, the user's forearms 24 are supported on and rest on an upper surface of the steering wheel 16. The user's hands and wrists 26 are supported in a cocked up or normal anatomical position by the assembly. The assembly 10 is mounted so that wheel 16 is lower and closer to horizontal than experienced in the typical automobile. The wheel and assembly are positioned below dashboard 16 so that the steering assembly does not interfere with the user's view of dashboard-mounted instruments.

Figure 2:
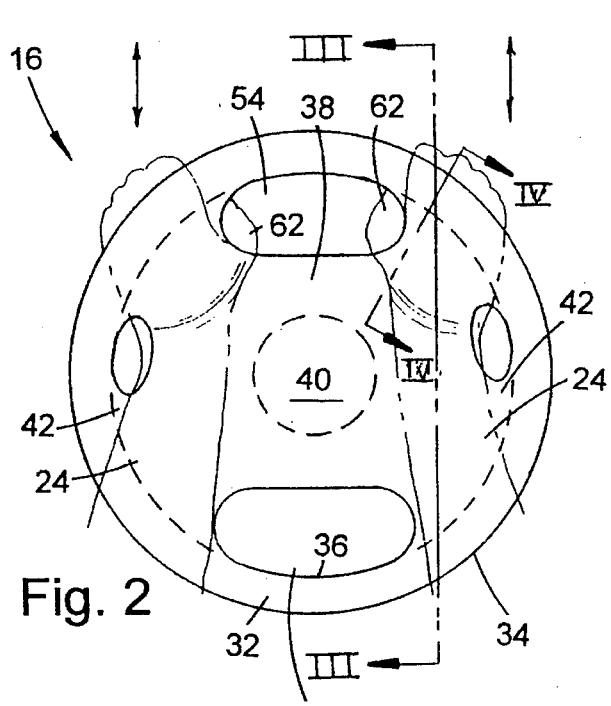
FIG. 2 is a plan view of a steering assembly in accordance with the present invention.
Figure 4:
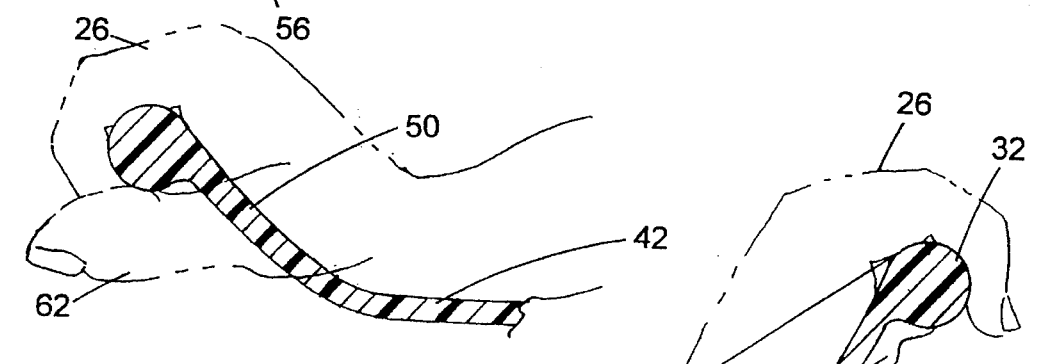
FIG. 4 is an enlarged, cross-sectional view taken generally along line IV—IV of FIG. 2.
Figure 3:
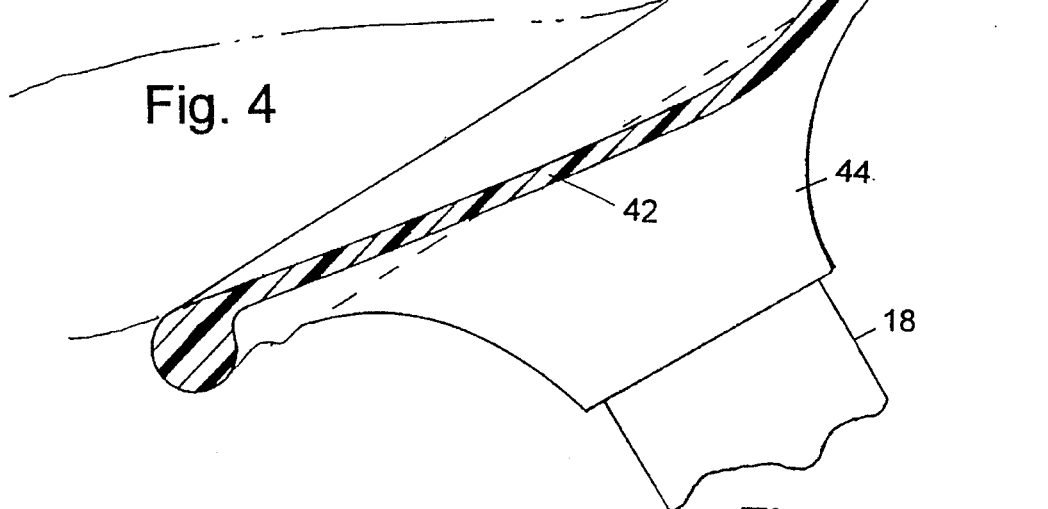
FIG. 3 is an enlarged, cross-sectional view taken generally along line III—III of FIG. 2.

As best seen in FIGS. 2, 3 and 4, steering wheel 16 includes a rim 32. Rim 32 is circular in plan view and in cross section. Rim 32 includes an outer peripheral surface 34 and an inner periphery 36. Wheel 16 further includes a support portion 38 joined to and formed integral with the inner periphery of rim 32. Support portion 38 extends from the lower end to the upper end of the steering wheel. Portion 38 includes a central area 40 and lateral or side areas 42. A hub 44 is joined to the undersurface of portion 38. Wheel 16 is secured to the steering shaft within column 18 in a conventional manner. Hub 44 and central area 40 may enclose an airbag, passive restraint system, in a conventional fashion.

Lateral portions 42 of the support 38 define forearm support portions. The forearm support portions extend inwardly towards the center of the wheel and downwardly from the bottom of the wheel towards the top, as seen in FIG. 3. Portions 42 extend below the horizontal plane within which rim 32 is positioned. Forearm support portions 42 are angled from an outer or right side of the rim towards the central portion 40. The upper portions of support portions 42, as seen in FIGS. 3 and 4, define wrist and hand support areas 50. The wrist and hand support areas 50 are configured to position the hands 26 of the user in a substantially neutral, cocked up or normal anatomical position. Positioning and supporting the hands in this fashion reduces wrist and hand motion. Carpal tunnel syndrome symptoms are reduced or eliminated.

Steering wheel support 38 further defines upper and lower cutouts or apertures 54, 56. Aperture 54 defines a thumb cutout or aperture. The thumbs 62 of the user can extend through aperture 54 when the user grasps the steering wheel. The thumbs, as shown in FIG. 4, wrap around the rim. The fingers of the hands wrap around the upper surface of the rim. The framework of the hand rests on and is supported by area 50. Support 38 is dimensioned and configured to define a recess which positions the hands in the anatomical position with the hands rotated slightly inwardly and downwardly.

The steering wheel with the hands positioned in the ten o'clock and two o'clock positions, as shown in FIG. 2, is turned by using the large muscles of the arm, namely, the biceps and triceps in a pushing and pulling motion. The forearms are supported which reduces fatigue of the upper arms and shoulders. Fatigue problems in the neck are also eliminated. The hands are properly positioned to eliminate or minimize pressure on the median nerve. The support reduces the grip pressure of the user. This eliminates numbness and other symptoms associated with driving.

The ergonomically designed steering wheel reduces the pain and fatigue associated with driving suffered by carpal tunnel syndrome sufferers. The steering wheel prevents obstruction of the dashboard-mounted instruments. The adjustability of the assembly accommodates the physical characteristics of a wide range of potential users. Proper arm support and hand positioning are achieved with an assembly which steers in a conventional manner. Safety considerations associated with elimination of the steering wheel are not presented. The assembly does not present a steering mechanism with which the average operator would not be familiar or with which the operator would require training for proper use.

In view of the above description, those of ordinary skill in the art may envision various modifications which would not depart from the inventive concepts disclosed herein. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. A steering wheel for use in a vehicle to support the hands wrists and forearms of the user and thereby reduce associated strain and numbness, said steering wheel comprising:

a rim defining the periphery of the steering wheel and having a normally lower portion and a normally upper portion;

a user support portion disposed within an interior area of said rim, and enclosing at least a major portion of the interior area; said user support portion being constructed integral with said rim, and having a cupped shape which extends generally continuously from said rim lower portion to said rim upper portion, and including:

a forearm support portion joined integrally with said rim adjacent said rim lower portion and defining laterally spaced forearm support surfaces having a curvilinear shape which is adapted to conform to the shape of the user's forearms; and a hand and wrist support portion joined integrally with said rim adjacent said rim upper portion, said hand and wrist support portion having a curvilinear shape which is adapted to conform to the shape of the user's hands and wrists and is adapted to position the user's hands in a neutral, cocked up, anatomical position when the rim is grasped by the user.

2. A steering wheel as defined by claim 1 wherein said hand and wrist support portion defines a thumb aperture at said rim upper portion adapted to allow the user's thumbs to be wrapped around the steering wheel.

3. A steering wheel as defined by claim 2 wherein said hand and wrist support portion defines laterally spaced, inwardly and downwardly curved surfaces for support of the wrist and framework of the hand with the fingers wrapped over the rim.

4. A steering wheel as defined by claim 3 wherein said rim is circular in plan.

5. A steering wheel as defined by claim 4 wherein said forearm support portion curves inwardly and downwardly below the plane of the rim towards said hand and wrist support portion.

\* \* \* \* \*